United States Patent
Sugiura et al.

(10) Patent No.: US 9,601,221 B2
(45) Date of Patent: Mar. 21, 2017

(54) OPENING AND CLOSING DEVICE FOR ACCESS PORT THAT OPENS TO WORKING PLATFORM OF REACTOR VESSEL

(75) Inventors: Atsushi Sugiura, Tokyo (JP); Takumi Hori, Tokyo (JP); Kenji Nishikawa, Tokyo (JP); Ken Onishi, Tokyo (JP); Noriaki Shimonabe, Tokyo (JP); Satoshi Tsuzuki, Hiroshima (JP); Ikuo Wakamoto, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1230 days.

(21) Appl. No.: 13/263,468

(22) PCT Filed: Jun. 8, 2010

(86) PCT No.: PCT/JP2010/003803
§ 371 (c)(1),
(2), (4) Date: Oct. 7, 2011

(87) PCT Pub. No.: WO2011/004547
PCT Pub. Date: Jan. 13, 2011

(65) Prior Publication Data
US 2012/0027153 A1 Feb. 2, 2012

(30) Foreign Application Priority Data
Jul. 10, 2009 (JP) .................... 2009-163876

(51) Int. Cl.
*G21C 19/02* (2006.01)
*G21C 13/00* (2006.01)
*G21C 19/20* (2006.01)

(52) U.S. Cl.
CPC ............ *G21C 19/02* (2013.01); *G21C 13/00* (2013.01); *G21C 19/207* (2013.01); *Y02E 30/40* (2013.01)

(58) Field of Classification Search
CPC ........... Y02E 30/31; Y02E 30/40; G21C 1/00; G21C 13/00; G21C 21/00; G21C 19/02;
(Continued)

(56) References Cited

U.S. PATENT DOCUMENTS 3,756,915 A * 9/1973 Bukrinsky et al. ........... 376/249
4,394,022 A * 7/1983 Gilmore ........................ 277/377
(Continued)

FOREIGN PATENT DOCUMENTS

JP 59-218994 A 12/1984
JP 62-088995 A 4/1987
(Continued)

OTHER PUBLICATIONS

Merriam Webster (Online Dictionary; Definition of circumference/circumferential; URL http://www.merriam-webster.com/dictionary/circumference; Drawn from internet Apr. 26, 2015).*
(Continued)

*Primary Examiner* — Jack W Keith
*Assistant Examiner* — Daniel Wasil
(74) *Attorney, Agent, or Firm* — Westerman, Hattori, Daniels & Adrian, LLP

(57) ABSTRACT

An opening and closing device that opens and closes an access port opened from a substantially cylindrical working platform disposed inside a reactor vessel and used to access a nozzle stub of the reactor vessel from the inside of the working platform, the opening and closing device includes: a cover that is slidable along an outer peripheral surface or an inner peripheral surface of the working platform from a closing position where the access port is closed to an opening position where the access port is opened; and moving device for sliding the cover.

10 Claims, 11 Drawing Sheets

(58) Field of Classification Search
CPC ...... G21C 19/14; G21C 19/20; G21C 19/207; G21Y 2002/30; G21Y 2002/361; G21Y 2004/30; G21Y 2004/304
USPC ............... 376/203, 204, 205, 245, 293, 260; 414/146
See application file for complete search history.

(56) References Cited

U.S. PATENT DOCUMENTS

| | | | | |
|---|---|---|---|---|
| 4,436,692 A | * | 3/1984 | Stenabaugh | ............ 376/204 |
| 4,690,795 A | | 9/1987 | Hardin, Jr. et al. | |

FOREIGN PATENT DOCUMENTS

| | | | | |
|---|---|---|---|---|
| JP | 8-304306 A | 11/1996 | | |
| JP | 9-5477 A | 1/1997 | | |
| JP | 9-89786 A | 4/1997 | | |
| JP | 10-197679 A | 7/1998 | | |
| JP | 2002-014192 A | 1/2002 | | |
| JP | 2002-081207 A | 3/2002 | | |
| JP | 2002-116284 A | 4/2002 | | |
| JP | 2003-232271 | * | 8/2003 | ............ F02M 61/18 |
| JP | 2006-349596 | * | 12/2006 | ............ G21C 19/02 |
| JP | 2006-349596 A | 12/2006 | | |
| JP | 2007-003442 A | 1/2007 | | |
| JP | 2007-178334 A | 7/2007 | | |
| JP | 2007-183278 A | 7/2007 | | |

OTHER PUBLICATIONS

International Search Report of PCT/JP2010/003803, mailing date Sep. 14, 2010.
Written Opinion of PCT/JP2010/003803, mailing date Sep. 14, 2010.
Decision to Grant a Patent dated Nov. 17, 2016, issued in counterpart European Patent Application No. 10796861.2. (2 pages).

* cited by examiner

OPENING AND CLOSING DEVICE FOR ACCESS PORT THAT OPENS TO WORKING PLATFORM OF REACTOR VESSEL

TECHNICAL FIELD

The present invention relates to an opening and closing device that opens and closes an access port which is opened from a working platform used for performing work inside a reactor vessel and is used to access a nozzle stub of the reactor vessel from the inside of the working platform.

Priority is claimed on Japanese Patent Application No. 2009-163876, filed Jul. 10, 2009, the content of which is incorporated herein by reference.

BACKGROUND ART

Hitherto, the maintenance inside a nozzle stub of a reactor vessel has been necessarily performed under water since the inside of the reactor vessel is normally filled with cooling water. However, in order to perform the maintenance under water, all devices need to be designed to be waterproof. For this reason, since the devices are designed to be waterproof, the volume and the weight of the device increase, so that the handling of the device is difficult. For this reason, recently, a method of performing the maintenance inside the nozzle stub of the reactor vessel in atmosphere has been proposed.

Specifically, a working platform is installed inside the reactor vessel after the water level of the cooling water therein is made to be lower than that of the nozzle stub. Inside the working platform, a maintenance worker inserts and fixes a UT inspecting device into the nozzle stub, and performs UT inspection on a desired range.

CITATION LIST

Patent Literature

[PTL 1] Japanese Patent Application Laid-Open (JP-A) No. 2007-3442

SUMMARY OF INVENTION

Technical Problem

The method of PTL 1 is performed in an order such that the water level of the reactor vessel is decreased in advance and then the working platform is installed. For this reason, in a nuclear reactor, drainage needs to be performed down to a position where the upper structure of the reactor vessel is disposed. On the other hand, in order to perform a work by drainage only down to a position where the lower structure of the reactor vessel is disposed, the drainage needs to be performed after the working platform is disposed inside the reactor vessel while in the state of being filled with the cooling water. When the working platform is installed and removed, the cooling water is filled therein. For this reason, there is a need to provide an opening and closing device that opens and closes an access port used to access a nozzle stub from the inside of the working platform. However, since it is necessary to ensure a working space for a maintenance worker or a working device inside the working platform, there is a limitation on the space for disposing the opening and closing device.

The present invention is made in view of such circumstances, and it is an object of the present invention to provide an opening and closing device that opens and closes an access port used to access a nozzle stub from the inside of a working platform within a limited space.

Solution to Problem

In order to solve the above-described problems, the present invention proposes the following configuration.

An opening and closing device that opens and closes an access port opened from a substantially cylindrical working platform disposed inside a reactor vessel and used to access a nozzle stub of the reactor vessel from the inside of the working platform, the opening and closing device includes: a cover that is slidable along an outer peripheral surface or an inner peripheral surface of the working platform from a closing position where the access port is closed to an opening position where the access port is opened; and moving device for sliding the cover.

In this configuration, it is possible to open and close the access port by causing the moving device to slide the cover along the outer peripheral surface or the inner peripheral surface of the working platform from the closing position to the opening position. As described above, the cover only slides along the outer peripheral surface or the inner peripheral surface of the working platform. For this reason, as the installation space, a space needs to be provided in consideration of the size and the thickness of the cover from the closing position to the opening position and the moving device, and the installation space may be minimal.

A plurality of the access ports may be provided in the circumferential direction of the working platform, and the cover may be disposed in the circumferential direction to close the plurality of access ports.

In this case, since the cover is disposed to close the plurality of access ports, it is possible to open and close the plurality of access ports using one cover. For this reason, it is possible to efficiently open and close the plurality of access ports.

The cover may be movable in the vertical direction.

In this case, since the cover is movable in the vertical direction, it is possible to effectively use the space above or below the access port.

The cover may be movable in the circumferential direction.

In this case, since the cover is movable in the circumferential direction, it is possible to open and close the access port even when the space cannot be ensured above and below the access port.

The cover may be provided in the outer peripheral surface of the working platform.

In this case, since the cover is provided in the outer peripheral surface of the working platform to open and close the access port, it is possible to more effectively use the inner space of the working platform.

Sealing unit may be further provided between the cover and the working platform to seal the peripheral edge of the access port in a state in which the cover closes the access port.

In this case, since the peripheral edge of the access port between the cover and the working platform is sealed by the sealing unit, it is possible to smoothly slide the cover with respect to the working platform using a constant gap formed therebetween. Further, it is possible to reliably seal the peripheral edge of the access port using the sealing unit at the time of closing the access port.

The sealing unit may include a sealing member that is provided in one of the cover and the working platform and advances toward the other thereof to come into close contact therewith.

In this case, since the sealing member of the sealing unit advances from one of the cover and the working platform to the other thereof to come into close contact therewith, it is possible to seal the peripheral edge of the access port between the cover and the working platform.

The sealing member may be formed in a bag shape so as to be expanded by supplying a fluid thereinto to advance toward the other of the cover and the working platform and come into close contact therewith.

In this case, since the sealing member is formed in a bag shape, the sealing member is expanded by supplying a fluid thereinto, so that the sealing member advances toward the other of the cover and the working platform to come into close contact therewith and seal the peripheral edge of the access port between the cover and the working platform.

The sealing member may be a substantially plate-shaped member that advances from the cover toward the working platform to close the access port.

In this case, since the sealing member is formed in a substantial plate shape, the sealing member may close the access port by advancing from the cover toward the working platform.

The cover may be provided in the outer peripheral surface of the working platform, and a passage may be formed at a position of the cover facing the sealing member to communicate with the outer periphery.

In this case, since the passage is formed at a position of the cover facing the sealing member to communicate with the outer periphery, when there is a need to close the access port while the outside of the working platform is filled with the cooling water, the cooling water flows between the cover and the sealing member through the passage, so that a pressure acts on the sealing member toward the working platform. For this reason, it is possible to minimize the driving force when the sealing member advances to seal the access port.

An independent foamed body may be further provided in a surface of the sealing member facing the working platform to surround the access port.

In this case, since the surface of the sealing member facing the working platform is provided with the independent foamed body, the independent foamed body is elastically contracted to come into close contact with the working platform when closing the access port. Accordingly, the cooling water does not infiltrate into the independent foamed body, whereby the peripheral edge of the access port may be more reliably sealed.

Advantageous Effects of Invention

According to the opening and closing device of the present invention, it is possible to open and close the access port, opened from the working platform of the reactor vessel and used to access the nozzle stub from the inside of the working platform, within a limited space.

DESCRIPTION OF EMBODIMENTS

First Embodiment

Figure 1:
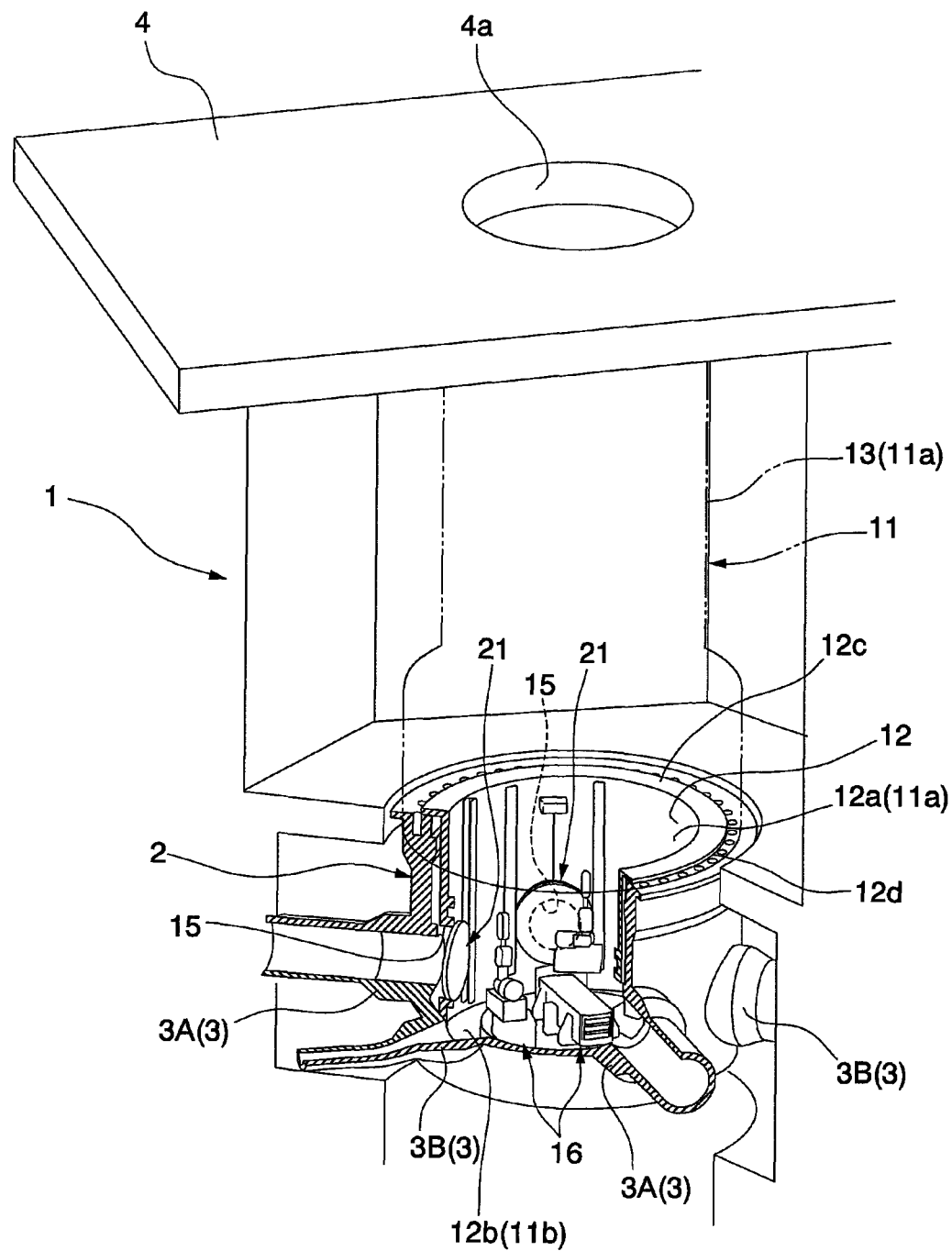
FIG. 1 is a partially cut-away perspective view illustrating an outline of a work for a nozzle stub that is an example in which an opening and closing device of a first embodiment of the present invention is used.

Hereinafter, a first embodiment according to the present invention will be described by referring to the drawings. FIG. 1 is an entire view illustrating an outline of a work for a nozzle stub in a reactor vessel. FIG. 1 illustrates a reactor vessel 2 of which the upper portion is opened by separating an upper cover as an upper structure and a reactor core as an inner structure therefrom inside a nuclear reactor 1. As shown in FIG. 1, the reactor vessel 2 is provided with at least a pair of an inlet nozzle stub 3A and an outlet nozzle stub 3B as a nozzle stub 3. In the embodiment, three pairs of the inlet nozzle stubs 3A and the outlet nozzle stubs 3B are provided. Cooling water may be introduced from the inlet nozzle stub 3A of each pair into the reactor vessel 2, and may be discharged from the outlet nozzle stub 3B of each pair.

As shown in FIG. 1, a working floor 4 is provided above the reactor vessel 2 to prepare equipment to be inserted into the reactor vessel 2. If necessary, a maintenance worker may carry out preparation for entry on the working floor 4. The working floor 4 is provided with a connection hole 4a that is opened up to a position where the reactor vessel 2 present directly below the working floor is disposed. A bottomed substantially cylindrical container body 11 is disposed from the connection hole 4a into the reactor vessel 2. Accordingly, even in the state where the outside is filled with the cooling water, the equipment may be inserted from the working floor 4 into the reactor vessel 2 or the maintenance worker may be disposed thereon in atmosphere.

As shown in FIG. 1, the container body 11 includes a working platform 12 that is disposed inside the reactor vessel 2 and a substantially cylindrical connection pipe line 13 connecting the working platform 12 to the working floor 4 above the reactor vessel 2. The working platform 12 includes a substantially cylindrical side wall 12a, a bottom plate 12b, and a flange 12c. The side wall 12a has an outer diameter smaller than the inner diameter of the reactor vessel 2. The bottom plate 12b closes the lower end of the side wall 12a. The flange 12c projects from the upper end of the side wall 12a toward the outer periphery to be supported by the upper edge of the reactor vessel 2. The working platform 12 is fixed to the reactor vessel 2 by using a fixing hole 12d formed in the flange 12c. The lower end of the connection pipe line 13 is fixed to the flange 12c of the working platform 12. A side wall 11a of the container body 11 is formed by the side wall 12a of the working platform 12 and the connection pipe line 13. The bottom 11b of the container body 11 is formed by the bottom plate 12b of the working platform 12. A gap between the flange 12c of the working platform 12 and the upper end of the reactor vessel 2 and a gap between the flange 12c of the working platform 12 and the lower end of the connection pipe line 13 are respectively sealed. Accordingly, even when the drainage is performed so that the water level inside the reactor vessel 2 is lower than that of the nozzle stub 3, the cooling water filled around the connection pipe line 13 above the reactor vessel 2 does not leak into the reactor vessel 2 or the container body 11.

In the container body 11, an access port 15 is opened from the side wall 12a of the working platform 12 to access each nozzle stub 3. Further, a moving device 16 is provided on the bottom plate 12b to insert the equipment into the nozzle stub 3 through the access port 15. As the moving device 16, various mechanisms may be applied. For example, examples of the moving device 16 include a multi-link manipulator, an expandable and contractible slide mechanism, and the like. Each access port 15 is provided with an opening and closing device 21 that opens and closes the access port 15. Hereinafter, the opening and closing device 21 will be specifically described by referring to FIGS. 2 to 5. Furthermore, in FIGS. 2 and 3, the moving device 16 and the like provided inside the working platform 12 are not shown so that the configuration of the opening and closing device 21 is easily understood.

Figure 2:
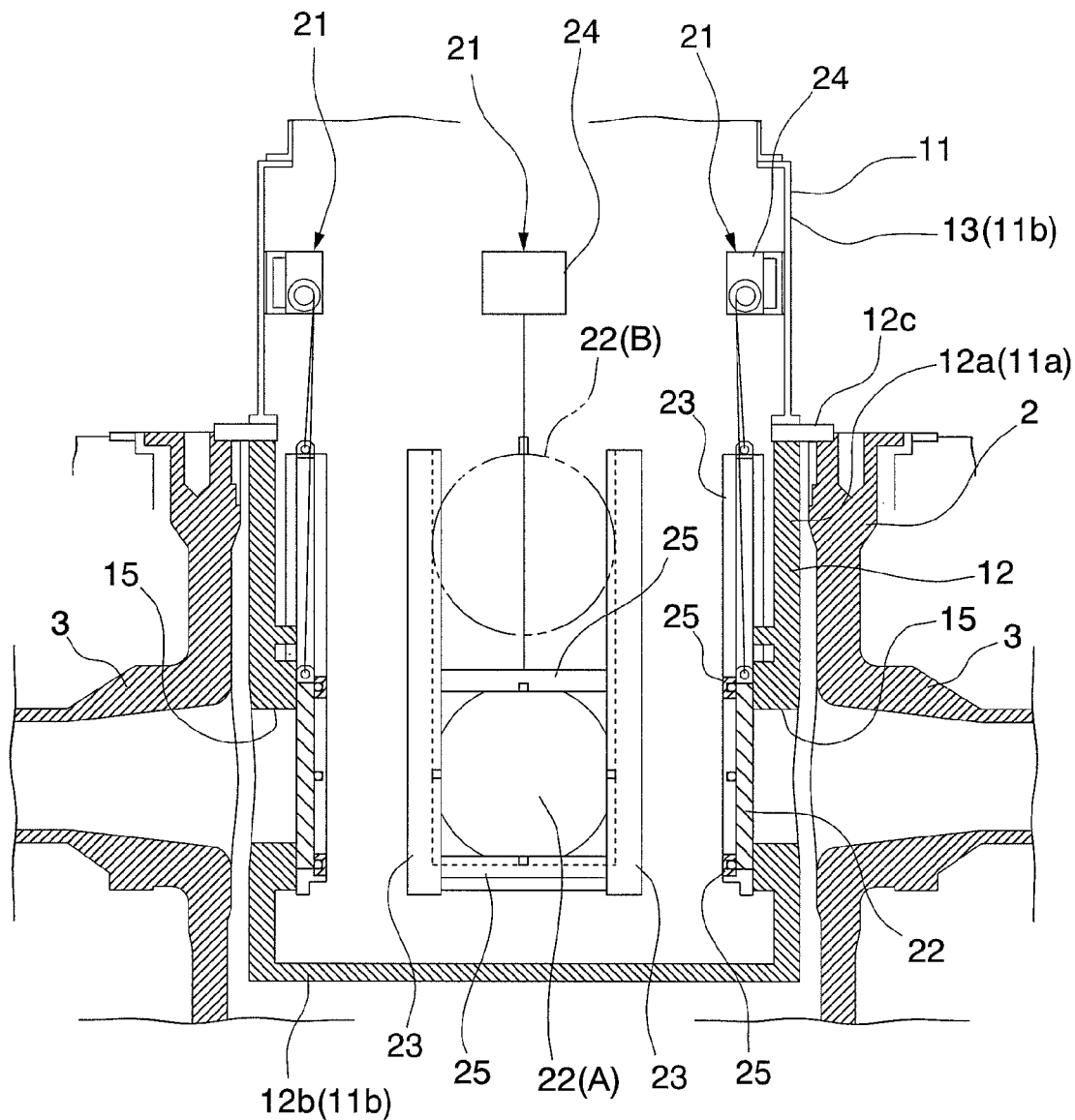
FIG. 2 is a side cross-sectional view illustrating a working platform provided with the opening and closing device of the first embodiment of the present invention.

As shown in FIG. 2, the access window opening and closing device 21 includes a substantially plate-shaped cover 22, a pair of guide rails 23, and an electric winch 24. The cover 22 is provided in the inner peripheral surface of the side wall 12a to correspond to each access port 15. The pair of guide rails 23 vertically guides the cover 22 with the cover interposed between the inner peripheral surface of the side wall 12a and the guide rails. The electric winch 24 is provided above the access port 15 to slide the cover 22 along the guide rails 23 in the vertical direction. A pair of support members 25 is provided at the upper and lower portions of the access port 15 across the pair of guide rails 23. A motor or the like serving as a driving portion of the electric winch 24 is not shown in the drawings, but is connected to a control device provided on the working floor 4. The motor or the like is used to wind and unwind the wire of the electric winch 24 under the control of the control device. Accordingly, the cover 22 is movable in the vertical direction from a closing position A where the access port 15 is closed to an opening position B where the access port is opened.

Figure 3:
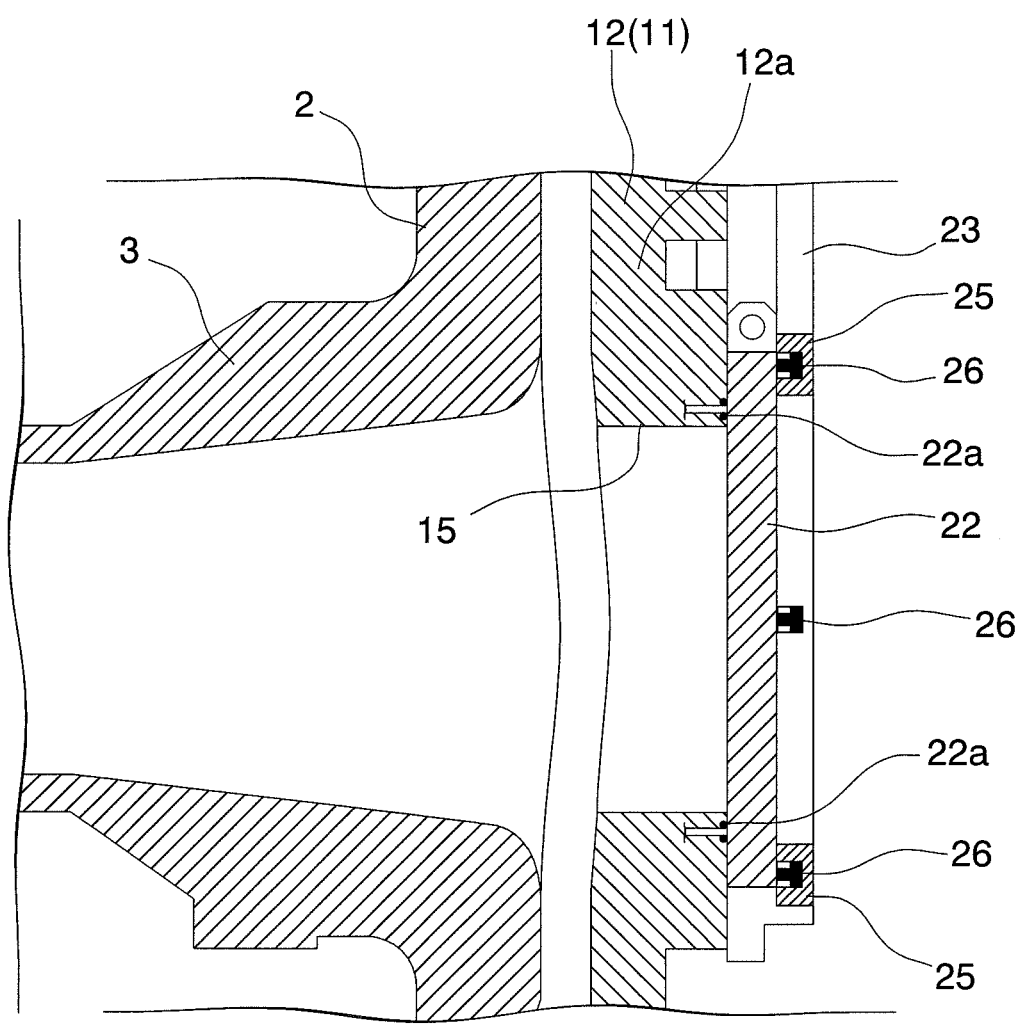
FIG. 3 is a side cross-sectional view specifically illustrating a cover and a guide of the opening and closing device of the first embodiment of the present invention.
Figure 4:
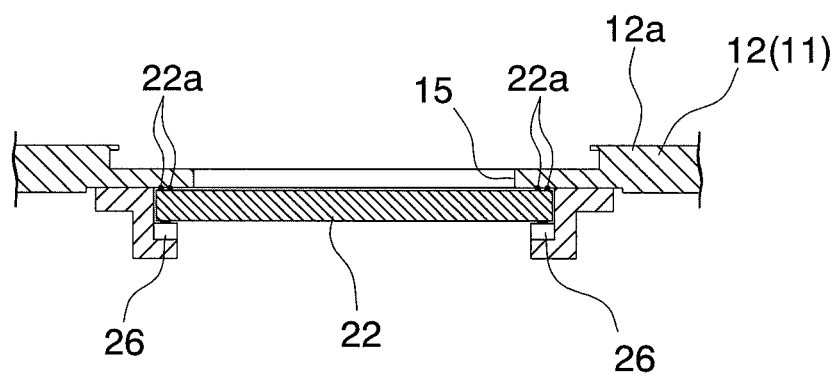
FIG. 4 is a side cross-sectional view specifically illustrating the cover and the guide of the opening and closing device of the first embodiment of the present invention.
Figure 5:
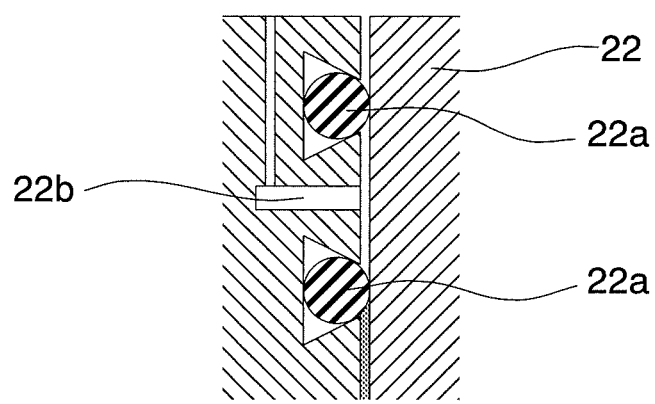
FIG. 5 is a cross-sectional view illustrating a sealing state between the cover and the working platform of the opening and closing device of the first embodiment of the present invention.

As shown in FIGS. 3 and 4, the surfaces of the pair of guide rails 23 and the pair of support members 25 facing the side wall 12a are provided with hydraulic cylinders 26 that are movable in a reciprocating manner toward the cover 22 to press the cover 22 against the working platform 12. The hydraulic cylinder 26 is connected to an operating water supply device connected to a control device provided on the working floor 4 through a pipe (not shown). When the operating water supply device is driven under the control of the control device, the hydraulic cylinder 26 may be moved in a reciprocating manner. Further, as shown in FIG. 5, two O-rings 22a are disposed at the peripheral edge of the access port 15 of the side wall 12a of the working platform 12. When the cover 22 is pressed toward the side wall 12a by the hydraulic cylinder 26, the O-rings 22a are elastically deformed. Accordingly, even when the outside of the working platform 12 is under water, it is possible to more reliably prevent the intrusion of water through the access port 15. Furthermore, a leakage detecting port 22b is provided between the two O-rings 22a inside the side wall 12a. The leakage detecting port 22b is configured to detect whether the water intrudes into the leakage detecting port 22b by using a liquid level sensor (not shown). For this reason, when the intrusion of the water is detected, the work may be promptly stopped.

Next, the operation of the opening and closing device 21 will be described. In FIG. 1, at the time of performing work inside the reactor vessel 2, the working floor 4 is first installed. Next, the working platform 12 and the connection pipe line 13 are assembled on the working floor 4 to construct the container body 11. Furthermore, the opening and closing device 21 is installed therein, the cover 22 is located at the closing position A (refer to FIG. 2), and the cover 22 is pressed against the working platform 12 by the hydraulic cylinder 26. Accordingly, the access port 15 is closed.

The constructed container body 11 is moved down while being hung on a crane or the like, and the working platform 12 is inserted into the reactor vessel 2 until the flange 12c comes into contact with the upper end of the reactor vessel 2. Accordingly, the inside of the working platform 12 may be provided with an atmospheric environment while the inside of the nuclear reactor 1 is filled with the cooling water. Further, the flange 12c may seal the outer space of the connection pipe line 13 corresponding to an upper space of the reactor vessel 2 and a space between the reactor vessel 2 and the working platform 12. For this reason, only the water level inside the reactor vessel 2 may be decreased until the water level becomes lower than that of the nozzle stub 3 while the outer space of the connection pipe line 13 is filled with the cooling water. Accordingly, the outside of the working platform 12 may also be made to have an atmospheric environment. In this state, the hydraulic pressure of the hydraulic cylinder 26 is first decreased to release a state where the cover 22 is pressed against the working platform 12. Next, the electric winch 24 is driven to slide the cover 22 along the inner peripheral surface of the working platform 12 from the closing position A to the opening position B. Accordingly, an access window 15 is opened, so that access from the inside of the working platform 12 to the outside nozzle stub 3 is permitted.

At the time of removing the container body 11 after all works are completed, the container body is removed in the opposite order to the above-described order. That is, the electric winch 24 of the opening and closing device 21 is driven to slide the cover 22 downward along the inner peripheral surface of the working platform 12 from the opening position B to the closing position A. Next, the hydraulic pressure of the hydraulic cylinder 26 is increased to advance toward the cover 22, so that the cover 22 is pressed against the working platform 12. Accordingly, the access port 15 is closed. In this state, the water level inside the reactor vessel 2 is recovered, and then the container body 11 is moved up.

According to the above-described opening and closing device 21, the cover 22 is only slid along the inner peripheral surface of the working platform 12 when opening and closing the access port 15. For this reason, as the installation space, a space needs to be provided in consideration of the size and the thickness of the cover 22 from the closing position A to the opening position B and the electric winch 24 as moving device. That is, the installation space may be minimal. For this reason, as shown in FIG. 1, the space inside the working platform 12 may be effectively used as the movable range of the moving device. Further, even when the working device is moved down for use, the movable range of the working device may be effectively ensured. In the opening and closing device 21 of the embodiment, the cover 22 moves in the vertical direction from the closing position A to the opening position B, so that the access port 15 may be opened and closed by effectively using the upper space of the access port 15. Further, the space of the moving device or the working device may be effectively ensured at the same position as that of the access port 15 in the vertical direction. Furthermore, in the description above, one electric winch 24 is provided for each cover 22, but the present invention is not limited thereto. For example, when a plurality of covers 22 is attached to an annular member and the annular member is moved in the vertical direction by the electric winch 24, the number of the electric winches 24 may be decreased.

Second Embodiment

Next, a second embodiment of the present invention will be described. FIGS. 6 to 9 illustrate the second embodiment of the present invention. Furthermore, in the embodiment, the same reference numerals are given to the same components used in the above-described embodiment, and the description thereof is not repeated.

Figure 6:
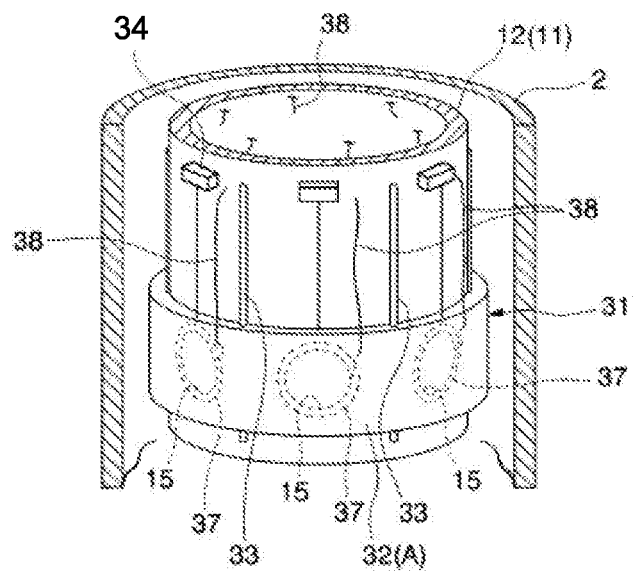
FIG. 6 is a perspective view illustrating a state where a cover is present at a closing position in a working platform provided with an opening and closing device of a second embodiment of the present invention.
Figure 7:
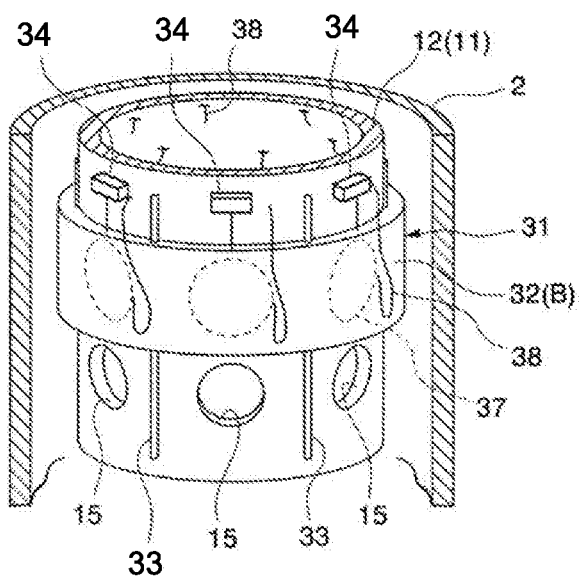
FIG. 7 is a perspective view illustrating a state where the cover is present at an opening position in the working platform provided with the opening and closing device of the second embodiment of the present invention.

As shown in FIGS. 6 and 7, an opening and closing device 31 includes a cover 32, a guide 33, and an electric winch 34. The cover 32 is formed in an annular shape along the circumferential direction in the outer peripheral surface of the working platform 12. The guide 33 is provided in the outer peripheral surface of the working platform 12 to guide the cover 32 in the vertical direction. The electric winch 34 is provided in the outer peripheral surface of the working platform 12 to move the cover 32 from the closing position A to the opening position B in the vertical direction. The cover 22 is formed in an annular shape along the circumferential direction. Accordingly, the cover 22 may simultaneously close a plurality of the access ports 15 formed in the working platform 12 in the circumferential direction.

Figure 8:
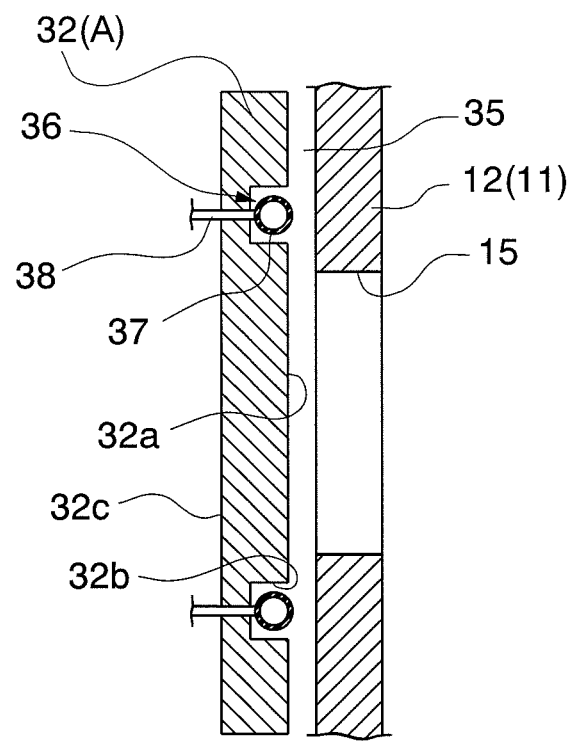
FIG. 8 is a cross-sectional view specifically illustrating sealing unit in the opening and closing device of the second embodiment of the present invention.
Figure 9:
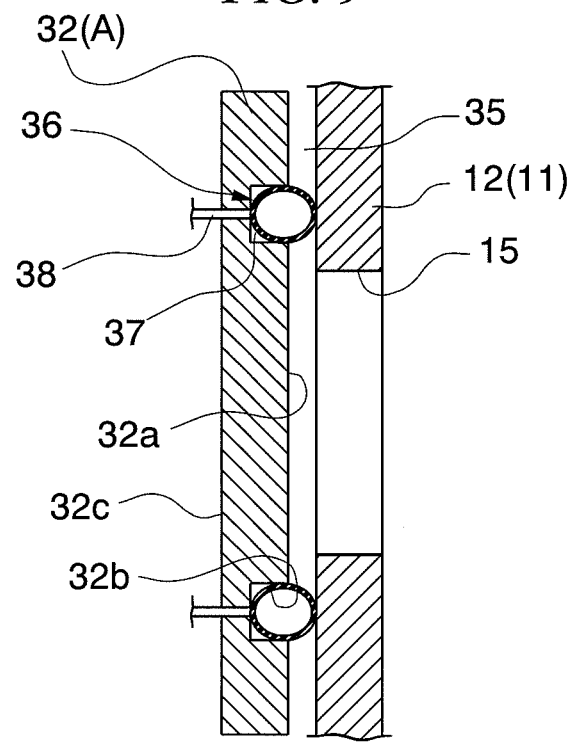
FIG. 9 is a cross-sectional view illustrating a sealing state using the sealing unit in the opening and closing device of the second embodiment of the present invention.

As shown in FIG. 8, a gap 35 is formed between the working platform 12 and the cover 32 to more smoothly move the cover 32, and sealing unit 36 is provided to seal the gap 35. The sealing unit 36 includes a bag-shaped sealing member 37 that is disposed in an annular shape outside the access port 15 to face the working platform 12 and a supply pipe 38 that communicates with the inside of the sealing member 37 to supply air thereinto. An inner peripheral surface 32a of the cover 32 facing the working platform 12 is provided with an annular groove 32b present outside the access port 15, and the sealing member 37 is received in the groove 32b. The sealing member 37 is formed of, for example, an elastically deformable material such as rubber. The sealing member 37 expands by supplying air thereinto and contracts by discharging air therefrom. One end of the supply pipe 38 is connected to the sealing member 37 in a manner such that it penetrates a groove 32b from an outer peripheral surface 32c of the cover 32. The other end of the supply pipe 38 penetrates the working platform 12 from the outer periphery to the inner periphery toward the upside of the cover 22. The supply pipe 38 passes through the inside of the connection pipe line 13 (refer to FIG. 1) and is connected to an air supply device (not shown) on the working floor 4. When air is supplied from the supply pipe 38 into the sealing member 37, as shown in FIG. 9, the sealing member 37 is expanded to come into close contact with the working platform 12.

In the opening and closing device 31 of the embodiment, it is possible to effectively use the space by sliding the cover 32 as in the first embodiment. Further, when the outer peripheral surface of the working platform 12 is provided with the cover 32 and the electric winch 34, it is possible to more effectively use the inner space. Furthermore, since the covers 32 are disposed in an annular shape along the circumferential direction, it is possible to open and close a plurality of the access ports 15 at one time. Accordingly, it is possible to efficiently open and close the access ports 15 and decrease the number of the electric winches 34. Further, it is possible to reduce the installation space of the electric winch 34. Further, since the peripheral edge of the access port 15 between the cover 32 and the working platform 12 is sealed by the sealing unit 36, it is possible to smoothly slide the cover 32 with respect to the working platform 12 using the constant gap 35. At the time of closing the access port 15, the gap 35 may be reliably sealed by the sealing unit 36. Furthermore, in the description above, the sealing unit 36 is provided in the cover 32, but the present invention is not limited thereto. For example, the sealing unit 36 may be provided in the working platform 12.

Figure 10:
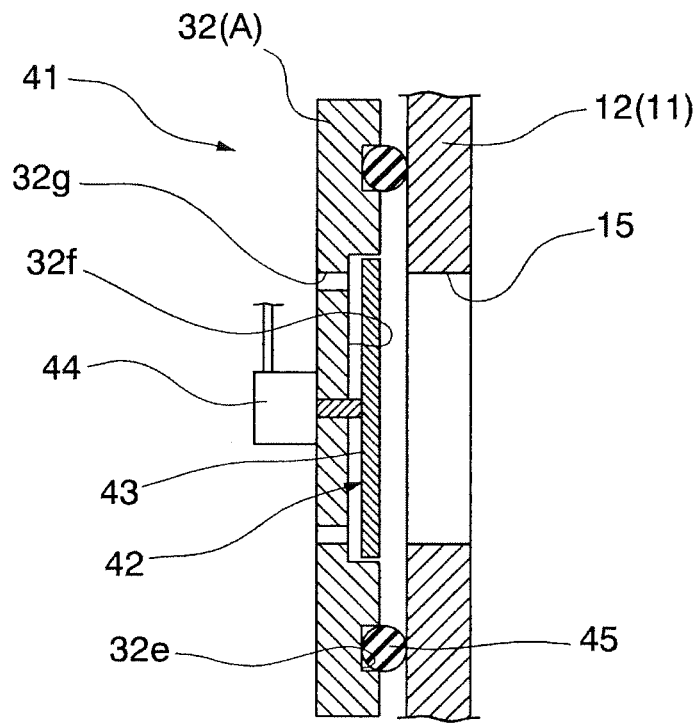
FIG. 10 is a cross-sectional view specifically illustrating the sealing unit in the opening and closing device of a first modified example of the second embodiment of the present invention.
Figure 11:
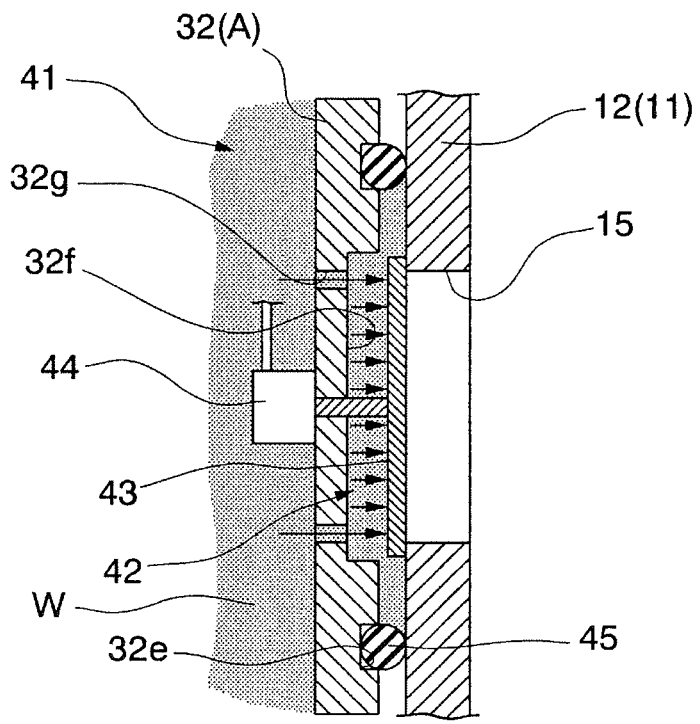
FIG. 11 is a cross-sectional view illustrating a sealing state using the sealing unit in the opening and closing device of the first modified example of the second embodiment of the present invention.

The present invention is not limited to the sealing unit that expands by supplying a fluid such as air thereinto to seal a gap between the working platform 12 and the cover 32 while coming into close contact therewith. FIGS. 10 and 11 illustrate a first modified example of the embodiment. As shown in FIG. 10, sealing unit 42 of an opening and closing device 41 of the modified example includes a substantially plate-shaped sealing member 43, a reciprocation driving portion 44, and an O-ring 45. The sealing member 43 is provided to face the access port 15. The reciprocation driving portion 44 is provided in the cover 32 to move the sealing member 43 close to or away from the working platform 12. The O-ring 45 is provided in the outer periphery of the access port 15 between the cover 32 and the working platform 12. The O-ring 45 is fitted to an annular groove 32e formed in the inner peripheral surface 32a of the cover 32, and is slidable when the cover 32 moves in the vertical direction with respect to the working platform 12. The size of the sealing member 43 is larger than that of the access port 15 so that it closes the access port 15, and may be received in a concave portion 32f formed in the cover 32. A passage 32g is formed at a position facing the sealing member 43 to allow the outer periphery and the inner peripheral surface to communicate with each other.

In the opening and closing device 41 of the modified example, at the time of closing the access port 15, the cover 32 is disposed at the closing position A, and the reciprocation driving portion 44 allows the sealing member 43 received in the concave portion 32f to advance toward the working platform 12 so that it is pressed. Accordingly, the access port 15 is covered by the cover 32. Further, since the sealing member 43 in the inner periphery of the cover 32 seals the access port by being brought into close contact with the working platform 12, it is possible to more reliably close the access port. The cover 32 is provided with the passage 32g. Accordingly, when the water level of the cooling water W inside the reactor vessel 2 is increased, the cooling water W flows from the passage 32g into a gap between the cover 32 and the working platform 12. Then, a pressure acts on the sealing member 43 sealing the access port 32 toward the working platform 12. For this reason, it is possible to minimize the driving force generated from the reciprocation driving portion 44 at the time of advancing the sealing member 43 to seal the access port 15. Accordingly, since the capability necessary for the reciprocation driving portion 44 may be suppressed, the size may be decreased and the space may be saved. Furthermore, in the embodiment, since the O-ring 45 is disposed in the outer periphery of the access port 15, the cooling water W only from the passage 32g flows into the range where the sealing member 43 is disposed between the cover 32 and the working platform 12. For this reason, when the water level of the cooling water W increases, the hydraulic pressure of the cooling water W may be appropriately applied to the sealing member 43 toward the working platform 12.

Figure 12:
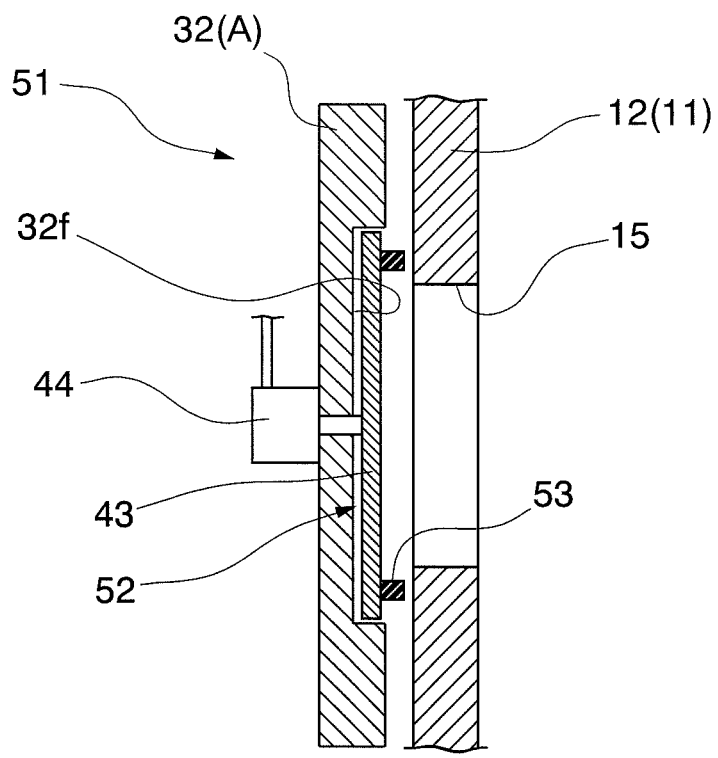
FIG. 12 is a cross-sectional view specifically illustrating sealing unit in an opening and closing device of a second modified example of the second embodiment of the present invention.
Figure 13:
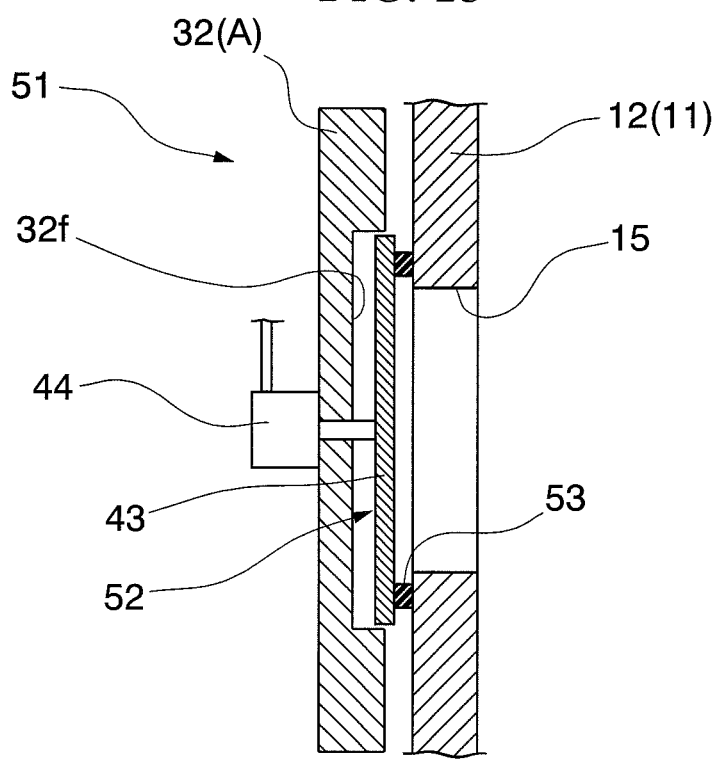
FIG. 13 is a cross-sectional view illustrating a sealing state using the sealing unit in the opening and closing device of the second modified example of the second embodiment of the present invention.

FIGS. 12 and 13 illustrate a second modified example of the embodiment. As shown in FIG. 12, in sealing unit 52 of an opening and closing device 51 of the modified example, a surface of the sealing member 43 facing the working platform 12 is provided with an independent foamed body 53 that surrounds the access port 15. For this reason, as shown in FIG. 13, at the time of closing the access port 15, the independent foamed body 53 interposed between the sealing member 43 and the working platform 12 elastically contracts to come into close contact with the working platform 12. Since the independent foamed body 53 is different from a simple foamed body of which foams communicate with each other, infiltration of the cooling water does not occur. Accordingly, it is possible to more reliably seal the peripheral edge of the access port 15.

Third Embodiment

Figure 14:
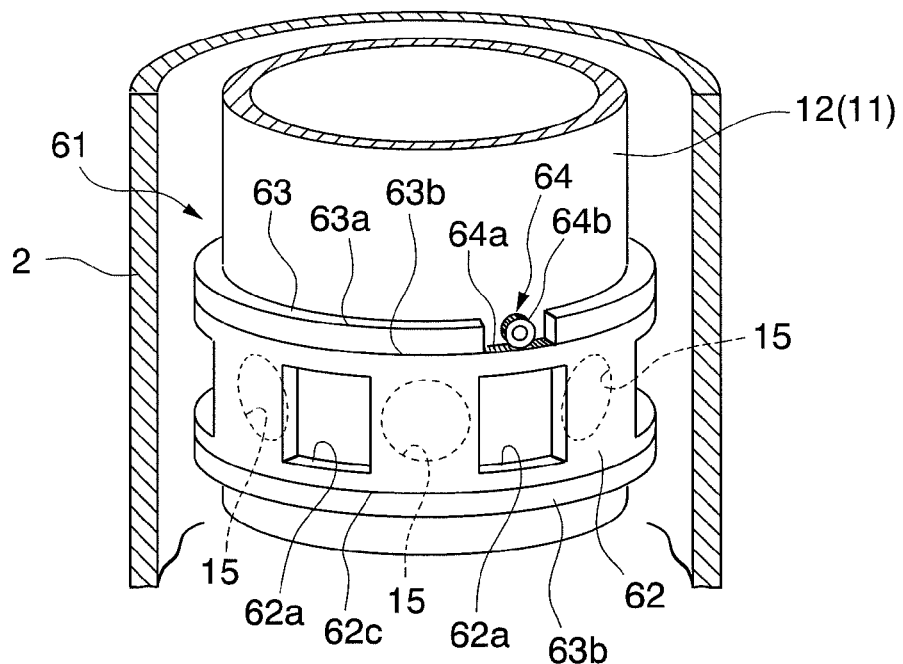
FIG. 14 is a perspective view illustrating a state where a cover is present at a closing position in a working platform provided with an opening and closing device of a third embodiment of the present invention.
Figure 15:
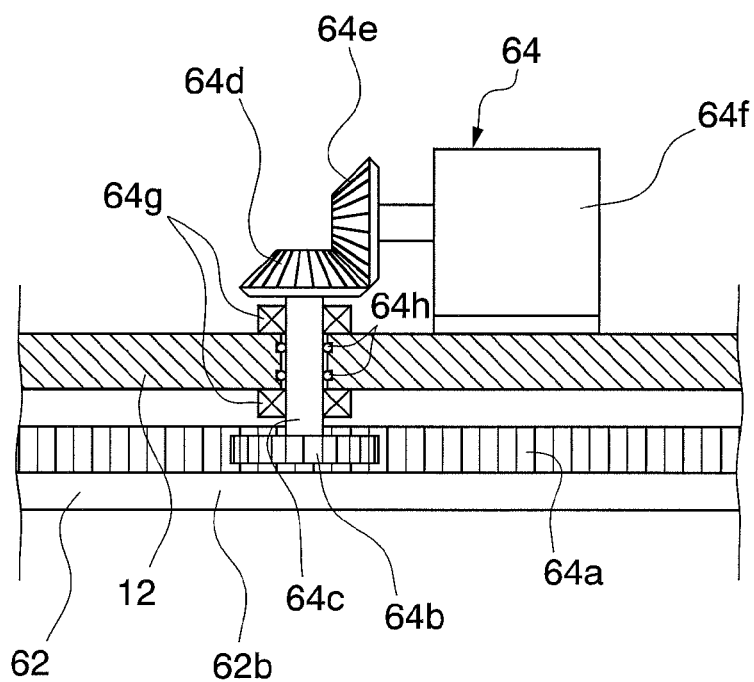
FIG. 15 is a perspective view illustrating a state where the cover is present at an opening position in the working platform provided with the opening and closing device of the third embodiment of the present invention.

A third embodiment of the present invention will be described. FIGS. 14 and 15 illustrate the second embodiment of the present invention. Furthermore, in the embodiment, the same reference numerals are given to the same components used in the above-described embodiment, and the description thereof is not repeated.

As shown in FIG. 14, an opening and closing device 61 of the embodiment includes a cover 62, a guide 63, and moving device 64. The cover 62 is formed in an annular shape along the circumferential direction in the outer peripheral surface of the working platform 12. The guide 63 is provided in the outer peripheral surface of the working platform 12 to wide the cover 62 in the circumferential direction. The moving device 64 is provided in the outer peripheral surface of the working platform 12 to move the cover 62 from the closing position A to the opening position B in the circumferential direction. The guide 63 includes upper and lower guides 63a and 63b that are provided in the outer peripheral surface of the working platform 12 to respectively guide an upper edge 62b of the cover 62 and a lower edge 62c of the cover 62. A notched portion 63c is provided at least one position of the upper guide 63a to expose the upper edge 62b of the cover 62. The notched portion 63c is provided with the moving device 64. As shown in FIG. 15, the moving device 64 includes a rack 64a, a pinion 64b, a shaft 64c, a first gear 64d, a second gear 64e, and a driving portion 64f. The rack 64a is formed at the upper edge 62b of the cover 62. The pinion 64b is disposed at the notched portion 63c to mesh with the rack 64a. The shaft 64c penetrates the working platform 12. The first gear 64d is connected to the pinion 64b and the shaft 64c. The second gear 64e meshes with the first gear 64d. The driving portion 64f rotates the second gear 64e. The shaft 64c is rotatably supported by a bearing 64g supported to the working platform 12. An O-ring 64h is fitted between the shaft 64c and the working platform 12 to seal a gap therebetween.

Figure 16:
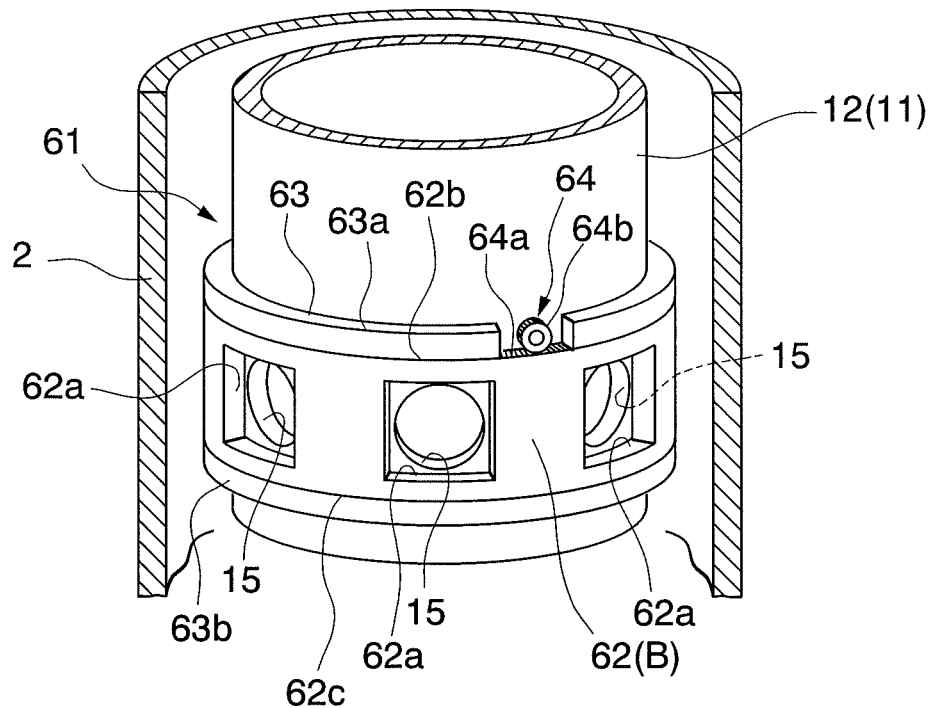
FIG. 16 is a perspective view illustrating a state where a cover is present at a closing position in a working platform provided with an opening and closing device of a third modified example of the second embodiment of the present invention.

In the opening and closing device 61 of the embodiment, at the time of opening the access port 15 closed as shown in FIG. 14, the driving portion 64f of the moving device 64 is driven to rotate the pinion 64b through the second gear 64e and the first gear 64d. Accordingly, the cover 62 provided with the rack 64a meshing with the pinion 64b moves along the guide 63 in the circumferential direction. Then, as shown in FIG. 16, when the cover 62 is moved until the opening 62a of the cover 62 communicates with the access port 15, the cover 62 is present at the opening position B where the access port 15 is opened. Then, the same operation may be performed at the time of closing the access port.

As described above, even in the opening and closing device 61 of the embodiment, it is possible to more effectively use the inner space by installing the cover 62 at the outer peripheral surface of the working platform 12 as in the second embodiment. Since the cover 62 is disposed in an annular shape in the circumferential direction, it is possible to open and close a plurality of the access ports 15 at one time. Accordingly, it is possible to more efficiently open and close the plurality of access ports 15. Furthermore, it is possible to decrease the number of the moving device 64. For this reason, it is possible to reduce the installation space of the moving device 64. In the embodiment, since the cover 62 slides in the circumferential direction to open and close the access port 15, it is possible to open and close the access port 15 even when a space is not ensured above and below the access port 15.

Figure 17:
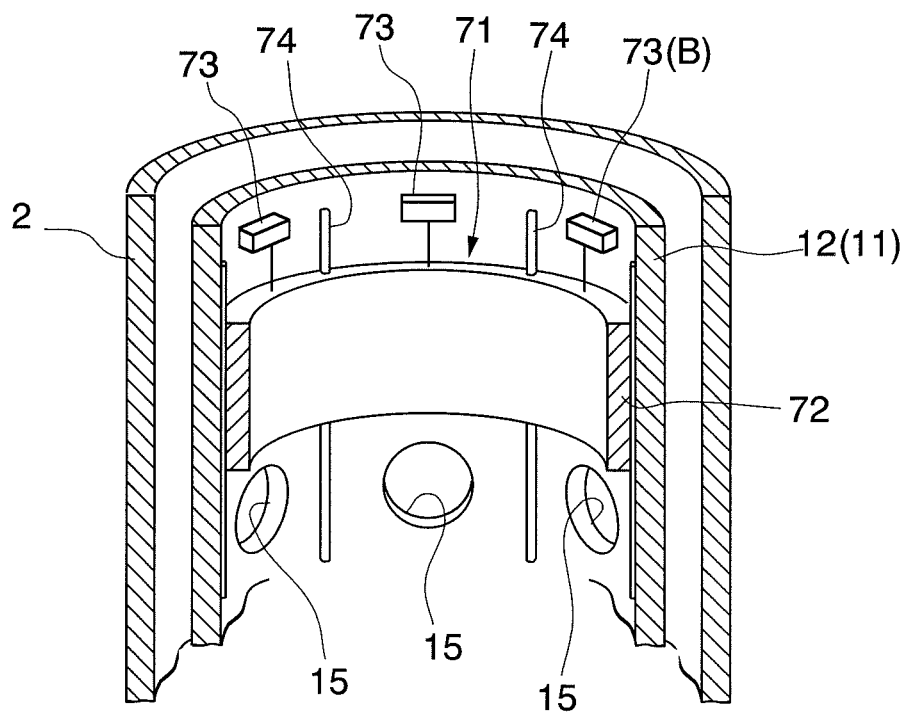
FIG. 17 is a perspective view illustrating a state where the cover is present at an opening position in the working platform provided with the opening and closing device of the third modified example of the second embodiment of the present invention.
Figure 18:
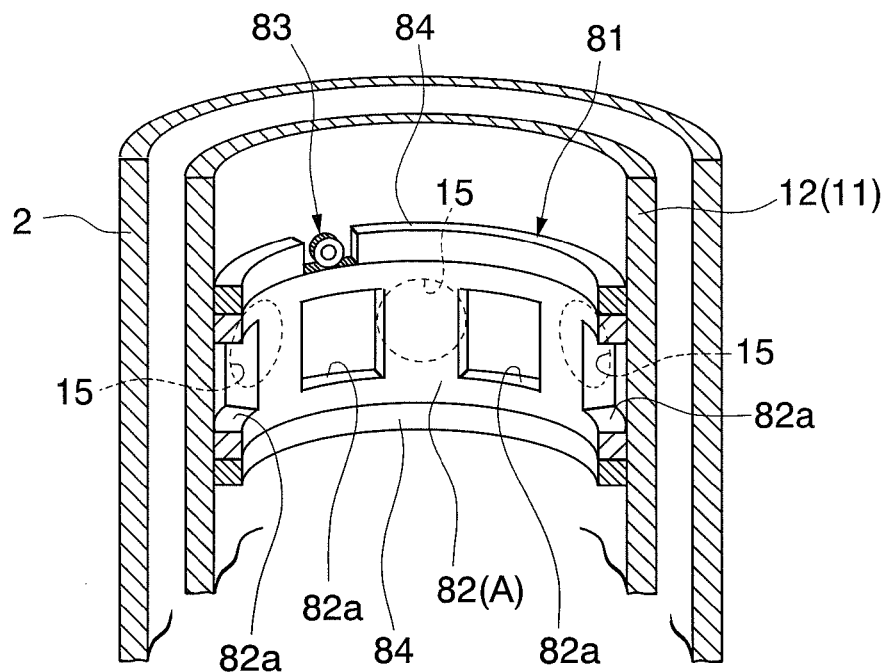
FIG. 18 is a perspective view illustrating a state where a cover is present at a closing position in a working platform provided with an opening and closing device of a first modified example of the third embodiment of the present invention.
Figure 19:
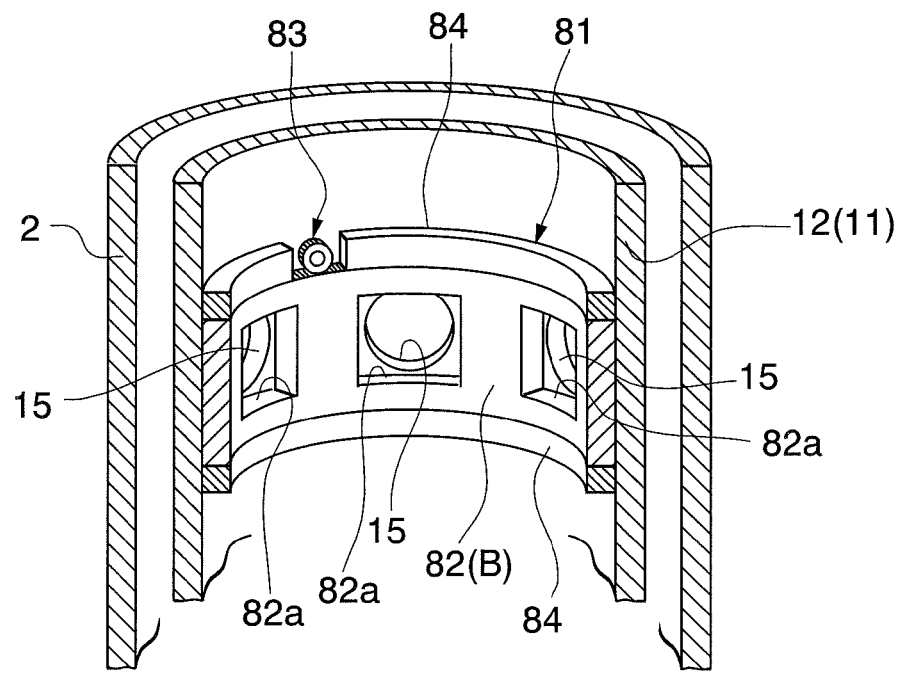
FIG. 19 is a perspective view illustrating a state where the cover is present at an opening position in the working platform provided with the opening and closing device of the first modified example of the third embodiment of the present invention.

In the second and third embodiments, the cover is provided in the outer peripheral surface of the working platform 12, but the present invention is not limited thereto. For example, the cover may be provided at the inner peripheral surface. FIG. 17 illustrates a modified example of the second embodiment, and FIGS. 18 and 19 illustrate a modified example of the third embodiment. That is, in the opening and closing device 71 shown in FIG. 17, the annular cover 72 provided in the inner peripheral surface of the working platform 12 is adapted to be movable in the vertical direction along a guide 74 by an electric winch 73 as moving device. In an opening and closing device 81 shown in FIGS. 18 and 19, an annular cover 82 provided in the inner peripheral surface of the working platform 12 and provided with an opening 82*a* corresponding to the access port 15 is movable in the circumferential direction along a guide 84 by moving device 83 configured as a rack and pinion mechanism which is the same as that of the third embodiment. Even in the configuration of the opening and closing devices 71 and 81, the access port 15 allowing the inside and the outside of the working platform 12 to communicate with each other may be opened and closed within a limited space by sliding the cover as in the other embodiments and modified examples.

While the embodiment of the present invention has been specifically described by referring to the drawings, the specific configuration is not limited to the embodiment, and modifications and the like within the spirit of the present invention are included in the present invention.

INDUSTRIAL APPLICABILITY

According to the opening and closing device of the present invention, it is possible to open and close the access port, opened from the working platform of the reactor vessel and used to access the nozzle stub from the inside of the working platform, within a limited space.

REFERENCE SIGNS LIST

2: REACTOR VESSEL
12: WORKING PLATFORM
15: ACCESS PORT
21, 31, 41 51, 61, 71, 81: OPENING AND CLOSING DEVICE
22, 32 62, 72, 82: COVER
24, 73: ELECTRIC WINCH (MOVING DEVICE)
32*g*: PASSAGE
36, 42, 52: SEALING UNIT
37, 43: SEALING MEMBER
53: INDEPENDENT FOAMED BODY
64, 83: MOVING DEVICE
A: CLOSING POSITION
B: OPENING POSITION

The invention claimed is:

1. A substantially cylindrical working platform provided with an opening and closing device,
   wherein the working platform is configured for arrangement inside a nuclear reactor vessel, and
   wherein the working platform is useable to access a nozzle stub of the nuclear reactor vessel from the inside of the working platform,
   wherein the working platform comprises a plurality of access ports spaced in a circumferential direction of the working platform,
   wherein the opening and closing device is arranged to open and close the plurality of access ports,
   wherein the opening and closing device comprises:
   a single unitary cover,
      wherein the cover is disposed in the circumferential direction,
      wherein the cover is formed in an annular shape along the circumferential direction, and
   a moving device operable to move the cover,
      wherein the moving device is operable to cause the cover to slide along an outer peripheral surface of the working platform from a closing position where the plurality of access ports are closed to an opening position where the plurality of access ports are open, and
   wherein the cover is slidably movable to simultaneously open the plurality of access ports,
   wherein the cover is slidably movable to simultaneously close the plurality of access ports.

2. The opening and closing device according to claim 1, wherein the cover is movable in the vertical direction.

3. The working platform according to claim 1, wherein the cover is movable in the circumferential direction.

4. The working platform according to claim 1, wherein the cover is provided in the outer peripheral surface of the working platform.

5. The working platform according to claim 1, wherein the opening and closing device further comprises a sealing unit, wherein
   the sealing unit is provided between the cover and the working platform, and
   the sealing unit seals a peripheral edge of the access port while the cover closes the access port.

6. The working platform according to claim 5, wherein the sealing unit includes a sealing member that is provided in one of the cover and the working platform and advances toward the other thereof to come into close contact therewith.

7. The working platform according to claim 6, wherein the sealing member is formed in a bag shape so as to be expanded by supplying a fluid thereinto to advance toward the other of the cover and the working platform and come into close contact therewith.

8. The working platform according to claim 6, wherein the sealing member is a substantially plate-shaped member that advances from the cover toward the working platform to close the access port.

9. The working platform according to claim 8, wherein the cover is provided in the outer peripheral surface of the working platform, and a passage is formed at a position of the cover facing the sealing member to communicate with the outer periphery.

10. The working platform according to claim 8, further comprising an independent foamed body, wherein
    the independent foamed body is provided in a surface of the sealing member facing the working platform, and
    the independent foamed body surrounds the access port.

* * * * *